United States Patent
Heaton

(10) Patent No.: US 10,100,912 B2
(45) Date of Patent: Oct. 16, 2018

(54) VEHICLE DIFFERENTIAL ASSEMBLY

(71) Applicant: GM Global Technology Operations LLC, Detroit, MI (US)

(72) Inventor: Jeffrey N. Heaton, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 501 days.

(21) Appl. No.: 14/873,642

(22) Filed: Oct. 2, 2015

(65) Prior Publication Data

US 2017/0097081 A1   Apr. 6, 2017

(51) Int. Cl.

| | |
|---|---|
| *F16H 57/04* | (2010.01) |
| *F16H 48/00* | (2012.01) |
| *F16H 48/42* | (2012.01) |
| *F16H 57/023* | (2012.01) |
| *F16H 57/037* | (2012.01) |
| *F16H 48/38* | (2012.01) |

(52) U.S. Cl.
CPC ........... *F16H 48/42* (2013.01); *F16H 57/023* (2013.01); *F16H 57/037* (2013.01); *F16H 57/0471* (2013.01); *F16H 57/0483* (2013.01); *F16H 2048/382* (2013.01); *F16H 2048/423* (2013.01)

(58) Field of Classification Search
CPC .......................... F16H 48/00–2048/426; F16H 57/00–2057/128
See application file for complete search history.

(56) References Cited

U.S. PATENT DOCUMENTS

| | | | | |
|---|---|---|---|---|
| 2,031,584 | A | * | 2/1936 | Austin .................... F16H 37/08 74/366 |
| 5,178,027 | A | * | 1/1993 | Kobayashi ............ F16H 57/021 475/59 |
| 6,345,712 | B1 | * | 2/2002 | Dewald ................... F16D 55/40 188/264 E |
| 2012/0172167 | A1 | * | 7/2012 | Myers ................. F16H 57/0424 475/160 |
| 2014/0231209 | A1 | * | 8/2014 | Nett ..................... F16H 57/0424 192/85.01 |
| 2017/0299044 | A1 | * | 10/2017 | Carr ........................ F16H 48/42 |

* cited by examiner

*Primary Examiner* — Ramya P Burgess
*Assistant Examiner* — Lillian T Nguyen
(74) *Attorney, Agent, or Firm* — Cantor Colburn LLP

(57) ABSTRACT

A vehicle differential assembly includes a differential housing including an outer surface and a driveshaft mounting end having a terminal end portion. A differential gear set is rotationally supported within the differential housing. A pinion gear is arranged in the differential housing. The pinion gear includes a head end drivingly connected to the differential gear set and a tail end extending through the driveshaft mounting end. A head bearing is arranged within the driveshaft mounting end. The head bearing supports the head end of the pinion gear. A tail bearing is supported by the outer surface of the differential housing. The tail bearing is configured and disposed to support the tail end of the pinion relative to the driveshaft mounting end.

19 Claims, 3 Drawing Sheets

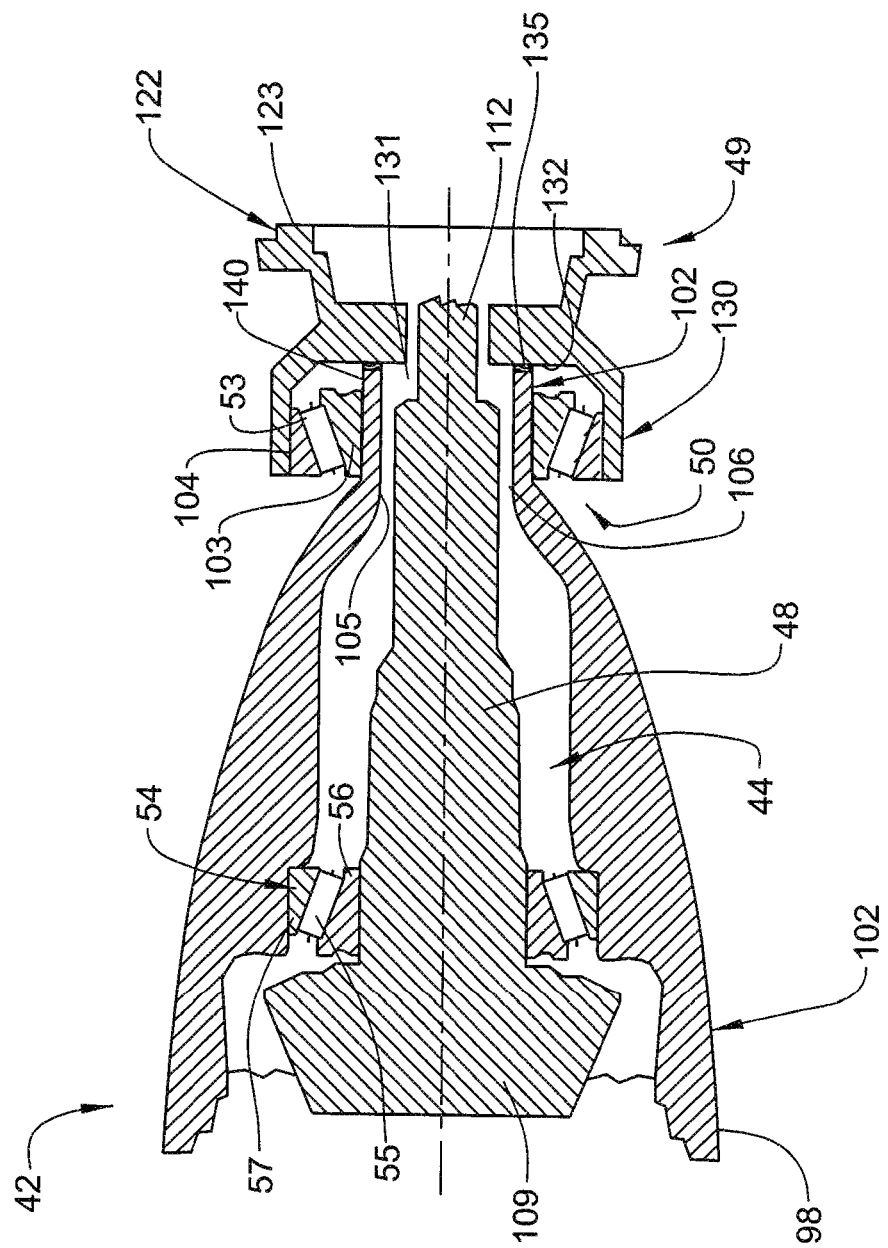

VEHICLE DIFFERENTIAL ASSEMBLY

FIELD OF THE INVENTION

The subject invention relates to the art of vehicle differential assemblies and, more particularly, to a vehicle differential assembly having an external tail end bearing.

BACKGROUND

Vehicles, such as automobiles and trucks for example, include a differential and axle assembly, sometime colloquially referred to as a drive module. This assembly is connected to the vehicle engine by a drive or prop-shaft having a mass. The prop-shaft transmits rotational energy (torque) developed by the vehicle engine to the differential and axle assembly, which in turn transmits the rotational energy to the wheels. In a rear-wheel drive vehicle, the prop-shaft directly couples the differential and axle assembly to the vehicle's transmission. In an all-wheel or four-wheel drive vehicle, additional components may also be included, such as a power take-off unit for example.

The prop-shaft imparts a mass load to the differential. More specifically, the prop-shaft is attached to a pinion gear of the differential through a pinion flange. In addition to applying rotational/torsional loads from the engine, the mass of the prop-shaft imparts a downward load to the pinion gear. Further, driveline systems often include dampers that may counteract a sympathetic vibration response triggered by engine firing excitation. Typically, the damper is mounted on the driveshaft or the pinion flange. The addition of the damper to the driveline system mass can force even more costly bearing and pinion size upgrades in order to maintain performance with the additional load. In order to address the loading of the prop-shaft, the pinion is made of a robust material that typically adds even more weight to the differential assembly. The type of material used to form the pinion gear increases manufacturing costs and also provides a negative impact on fuel economy.

Accordingly, it is desirable to provide a differential and axle assembly having a pinion gear that may possess a reduced weight yet still be designed to accommodate the rotational/torsional loads provided by the engine.

SUMMARY OF THE INVENTION

In accordance with an aspect of an exemplary embodiment, a vehicle differential assembly includes a differential housing including an outer surface and a driveshaft mounting end having a terminal end portion. A differential gear set is rotationally supported within the differential housing. A pinion gear is arranged in the differential housing. The pinion gear includes a head end drivingly connected to the differential gear set and a tail end extending through the driveshaft mounting end. A head end bearing is arranged within the driveshaft mounting end. The head bearing supports the head end of the pinion gear. A tail bearing is supported by the outer surface of the differential housing. The tail bearing is configured and disposed to support the tail end of the pinion relative to the driveshaft mounting end.

In accordance with another aspect of an exemplary embodiment, a vehicle includes a chassis, an engine mounted to the chassis, and a differential assembly mechanically linked to the engine through a driveshaft. The differential assembly includes a differential housing including an outer surface and a driveshaft mounting end having a terminal end portion. A differential gear set is rotationally supported within the differential housing. A pinion gear is arranged in the differential housing. The pinion gear includes a head end drivingly connected to the differential gear set and a tail end extending through the driveshaft mounting end. A head bearing is arranged within the driveshaft mounting end, the head bearing supporting the head end of the pinion gear. A tail bearing is supported by the outer surface of the differential housing. The tail bearing is configured and disposed to support the tail end of the pinion relative to the driveshaft mounting end.

In accordance with yet another aspect of an exemplary embodiment, a method of assembling a differential assembly includes mounting a head bearing within a driveshaft mounting end of a differential housing, supporting a tail bearing relative to an outer surface of the driveshaft mounting end, installing a pinion gear having a head end and a tail end into the differential housing. The head end is supported by the head bearing and the tail end is supported by the tail bearing.

The above features and advantages and other features and advantages of the invention are readily apparent from the following detailed description when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 3 is a partial cross-sectional view of the differential assembly of FIG. 2 taken at line 3-3.

DESCRIPTION OF THE EMBODIMENTS

Figure 1:
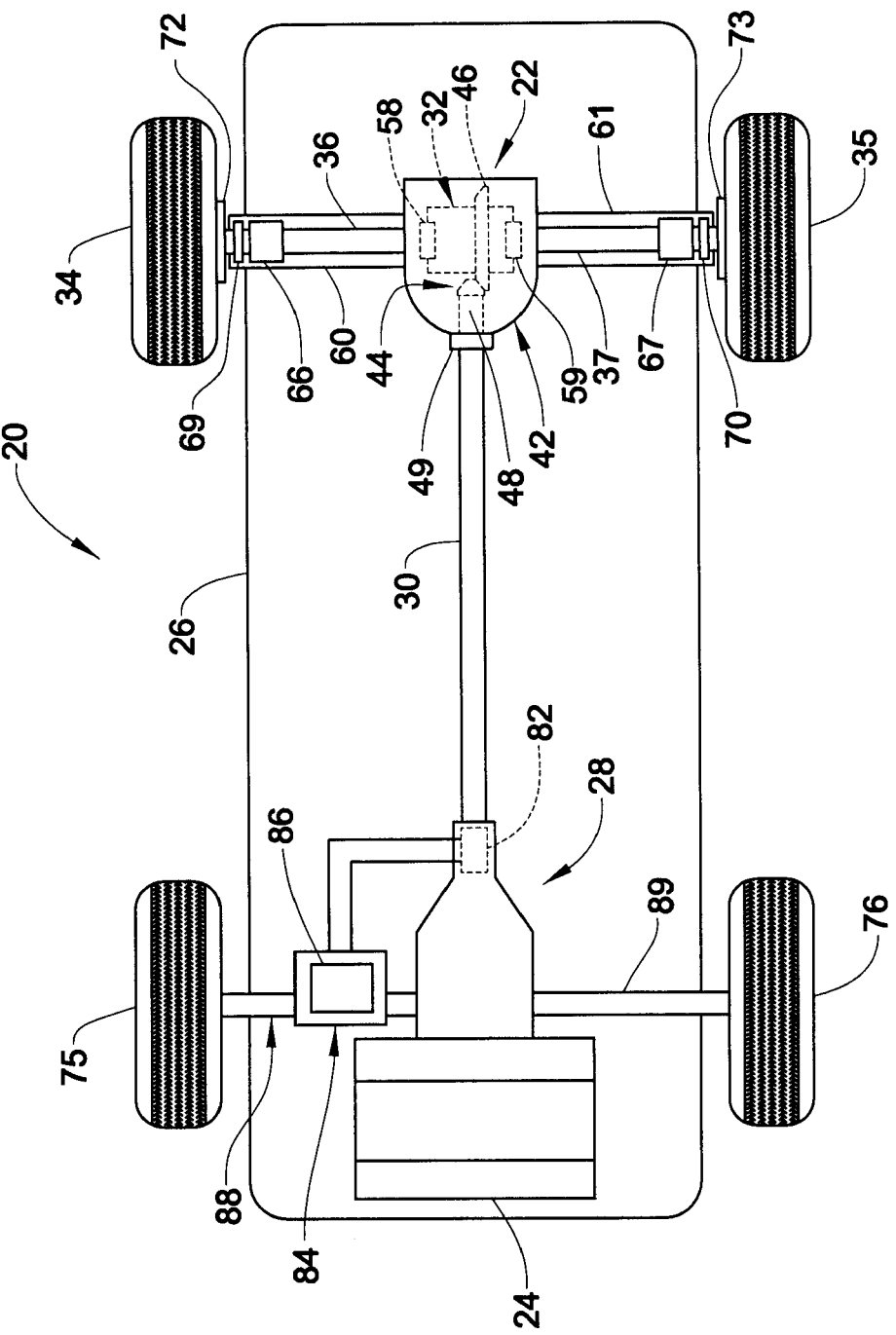
FIG. 1 is a top schematic view of a vehicle having a differential assembly in accordance with an embodiment of the invention.

The following description is merely exemplary in nature and is not intended to limit the present disclosure, its application or uses. It should be understood that throughout the drawings, corresponding reference numerals indicate like or corresponding parts and features.

In accordance with an embodiment of the invention, FIG. 1 illustrates a vehicle 20 having a rear differential assembly 22. Rear differential assembly 22 may sometimes be referred to as a rear drive module. It should be appreciated that vehicle 20 may be an automobile, truck, van or sport utility vehicle for example. As used herein, the term "vehicle" is not limited to just an automobile, truck, van or sport utility vehicle, but may also include any self-propelled or towed conveyance suitable for transporting a burden. Vehicle 20 may include an engine 24, such as a gasoline or diesel fueled internal combustion engine for example. Engine 24 may further be a hybrid type engine that combines an internal combustion engine with an electric motor for example. Engine 24 and differential assembly 22 are coupled to a frame or other chassis structure 26. Engine 24 is coupled to the rear differential assembly 22 by a transmission 28 and a driveshaft 30. Transmission 28 may be configured to reduce the rotational velocity and increase the torque of the engine output. This modified output is then transmitted to rear differential assembly 22 via driveshaft 30. Rear differential assembly 22 transmits the output torque from the driveshaft 30 through a differential gear set 32 to a pair of driven-wheels 34 and 35 via corresponding first and second axles 36 and 37.

Differential gear set 32 is arranged within a differential housing 42. Differential gear set 32 receives the output from the driveshaft 30 via a pinion gear 44 that transmits the torque to a ring gear 46. Pinion gear 44 includes a pinion shaft 48 that is coupled to the driveshaft 30 by a pinion flange 49. As will be detailed more fully below, pinion gear 44 is supported by a tail bearing 50 (FIG. 3), which may take the form of, for example, a roller bearing 53 (or other appropriate bearing, for example, a ball bearing), and a head bearing 54 which may take the form of, for example, a roller bearing 55 (or other appropriate bearing). Head bearing 54 includes an inner race 56 supported by pinion shaft 48 and an outer race 57 supported by an inner surface (not separately labeled) of differential housing 42. Further, differential gear set 32 is supported for rotation within differential housing 42 by a pair of differential bearings (not separately labeled). Differential gear set 32 includes first and second side gears 58 and 59 arranged within differential housing 42 that are coupled to and support one end of corresponding axles 36 and 37. The coupling of rotational components, such as pinion flange 49 to pinion gear 44 or side gears 58 and 59 to axles 36 and 37 for example, may be accomplished using a spline connection.

In one embodiment, each axle 36 and 37 extends into a corresponding axle tube 60 and 61. Each axle tube 60 and 61 includes a hollow interior (not separately labeled) that extends the length thereof. At one end of the axle tube 60 a bearing 66 is mounted to support the end of the axle 36 adjacent the driven-wheel 34. Another bearing 67 supports the end of axle 37 adjacent driven-wheel 35. A first shaft seal 69 is located between the bearing 66 and the driven-wheel 34. A second shaft seal 70 is located between the bearing 67 and the driven-wheel 35. A first wheel mounting flange 72 is coupled to the end of the axle 36 adjacent the bearing 66, and a second wheel mounting flange 73 is coupled to the end of the axle 37 adjacent the bearing 67. First and second flanges 72 and 73 provide an interface for mounting corresponding ones of driven-wheels 34 and 35.

Vehicle 20 further includes a front wheels 75 and 76 arranged adjacent the engine 24. In one embodiment, front wheels 75 and 76 are also configured to receive output from the engine 24. This is sometimes referred to as a four-wheel or an all-wheel drive configuration. In this embodiment, vehicle 20 may include a transfer case 82 that divides the output from the transmission 28 between the front and rear driven wheels 34, 35 and 75, 76. Transfer case 82 may transmit a portion of the output to a front differential assembly 84, which may include additional components such as a front differential gear set 86 and axles 88 and 89 that transmit the output to the wheels 75 and 76 respectively.

Figure 2:
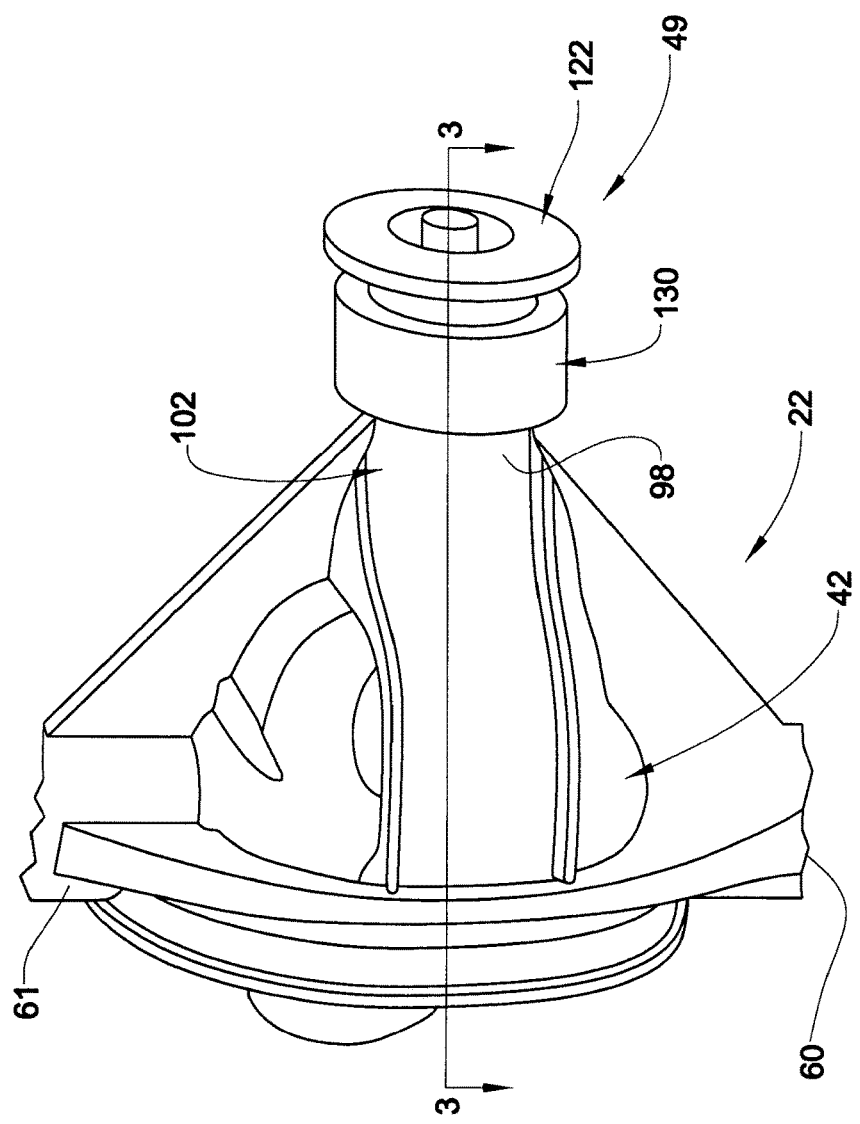
FIG. 2 is a partial perspective view of the differential assembly of FIG. 1.

In accordance with an aspect of an exemplary embodiment, illustrated in FIG. 2, differential housing 42 includes an outer surface 98 and a driveshaft mounting end 102. As will be detailed more fully below, driveshaft mounting end 102 supports driveshaft 30. In further accordance with an aspect of an exemplary embodiment, illustrated in FIG. 3, driveshaft mounting end 102 supports an inner race 103 of tail bearing 50 on outer surface 98. Tail bearing 50 also includes an outer race 104 which supports pinion gear 44 through pinion flange 49. Driveshaft mounting end 102 includes an inner surface 105 that defines a passage 106 which receives pinion shaft 48.

Pinion gear 44 includes a head end 109 supported by head bearing 54 and a tail end 112 that extends through passage 106 and is supported by tail bearing 50. More specifically, tail end 112 is operatively coupled to a pinion flange 49 which, as will be detailed more fully below, is supported by tail bearing 50. Tail end 112 may project proudly of driveshaft mounting end 102 or may remain within differential housing 42. Tail end 112 may connect to pinion flange 49 through a variety of known methods including a press-fit, a splined connection, and the like as discussed above.

Pinion flange 49 includes a flange portion 122 having a mounting surface 123 that couples to driveshaft 30 and a support portion 130 that is operatively coupled to outer surface 98 of differential housing 42 through tail bearing 50. Support portion 130 includes a recess 131 that receives tail bearing 50 and an inner surface 132. A seal 135 is provided between a terminal end portion 140 of driveshaft mounting end 102 and inner surface 132. Seal 135 fluidically isolates tail bearing 50 from head bearing 54 and differential gear set 32. As such, tail bearing 50 is an independently lubricated bearing that does not receive lubrication from differential assembly 22 but rather from an external source, such as could be pre-packaged with tail bearing 50 and/or added by a technician during installation and/or maintenance in a manner similar to that of a wheel bearing.

At this point, it should be understood that the exemplary embodiments describe a differential assembly having an external tail bearing which supports both the tail end of the pinion gear and the pinion flange. In this manner, the pinion gear may be mechanically decoupled from the driveshaft thereby being effectively isolated from hung loads. As a result, the pinion gear may be made from a lighter weight material to reduce an overall weight and/or size of the differential assembly. It should also be understood that while shown in connection with a rear differential assembly, the exemplary embodiments may also be employed in connection with a front differential assembly.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A vehicle differential assembly comprising:
    a differential housing including an outer surface and a driveshaft mounting end having a terminal end portion;
    a differential gear set rotationally supported within the differential housing;
    a pinion gear arranged in the differential housing, the pinion gear including a head end drivingly connected to the differential gear set and a tail end extending through the driveshaft mounting end;
    a head bearing arranged within the driveshaft mounting end, the head bearing supporting the head end of the pinion gear; and
    a tail bearing supported by the outer surface of the differential housing, the tail bearing being configured and disposed to support the tail end of the pinion relative to the driveshaft mounting end.

2. The vehicle differential assembly according to claim 1, further comprising: a pinion flange coupled to the tail end of the pinion, the pinion flange being supported by the tail bearing.

3. The vehicle differential assembly according to claim 1, wherein the tail bearing comprises a roller bearing.

4. The vehicle differential assembly according to claim 1, further comprising: a seal arranged at the driveshaft mounting end.

5. The vehicle differential assembly according to claim 1, wherein the tail bearing is fluidically isolated from the head end bearing.

6. The vehicle differential assembly according to claim 1, wherein the tail bearing comprises an independently lubricated bearing.

7. The vehicle differential assembly according to claim 2, wherein the tail bearing includes an inner race supported by the driveshaft mounting end of the differential housing and an outer race supporting the pinion flange.

8. The vehicle differential assembly according to claim 1, wherein the head bearing includes an inner race supported by the pinion gear and an outer race supported by an inner surface of the differential housing.

9. A vehicle comprising:
a chassis;
an engine mounted to the chassis; and
a differential assembly mechanically linked to the engine through a driveshaft, the differential assembly comprising:
a differential housing including an outer surface and a driveshaft mounting end having a terminal end portion;
a differential gear set rotationally supported within the differential housing;
a pinion gear arranged in the differential housing, the pinion gear including a head end drivingly connected to the differential gear set and a tail end extending through the driveshaft mounting end;
a head bearing arranged within the driveshaft mounting end, the head bearing supporting the head end of the pinion gear; and
a tail bearing supported by the outer surface of the differential housing, the tail bearing being configured and disposed to support the tail end of the pinion relative to the driveshaft mounting end.

10. The vehicle according to claim 9, further comprising: a pinion flange coupled to the tail end of the pinion, the pinion flange being supported by the tail bearing.

11. The vehicle according to claim 9, wherein the tail bearing comprises a roller bearing.

12. The vehicle according to claim 9, further comprising: a seal arranged at the driveshaft mounting end.

13. The vehicle according to claim 9, wherein the tail bearing is fluidically isolated from the head bearing.

14. The vehicle according to claim 9, wherein the tail bearing comprises an independently lubricated bearing.

15. The vehicle according to claim 10, wherein the tail bearing includes an inner race supported by the driveshaft mounting end of the differential housing and an outer race supporting the pinion flange.

16. The vehicle according to claim 9, wherein the head bearing includes an inner race supported by the pinion gear and an outer race supported by an inner surface of the differential housing.

17. A method of assembling a differential assembly comprising:
mounting a head bearing within a driveshaft mounting end of a differential housing;
supporting a tail bearing relative to an outer surface of the driveshaft mounting end; and
installing a pinion gear having a head end and a tail end into the differential housing, the head being supported by the head bearing and the tail being supported by the tail bearing.

18. The method of claim 17, further comprising: mounting a pinion flange to the tail bearing and the tail end of the pinion gear.

19. The method of claim 17, further comprising: positioning a seal at the driveshaft mounting end, the seal fluidically isolating the tail bearing from the head bearing.

* * * * *